United States Patent
Quetant et al.

(10) Patent No.: US 9,827,859 B2
(45) Date of Patent: Nov. 28, 2017

(54) METHOD OF MANAGING THE CHARGING OF A TRACTION BATTERY AND CORRESPONDING DEVICES

(71) Applicant: RENAULT S.A.S., Boulogne-Billancourt (FR)

(72) Inventors: Eudes Quetant, Guyancourt (FR); Virginie Goutal, La Celle les Bordes (FR); Christophe Ripoll, Chevreuse (FR); Eric Chauvelier, Le Mesnil Saint Denis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 370 days.

(21) Appl. No.: 14/390,491

(22) PCT Filed: Mar. 11, 2013

(86) PCT No.: PCT/FR2013/050507
§ 371 (c)(1),
(2) Date: Oct. 3, 2014

(87) PCT Pub. No.: WO2013/150200
PCT Pub. Date: Oct. 10, 2013

(65) Prior Publication Data
US 2015/0120112 A1    Apr. 30, 2015

(30) Foreign Application Priority Data

Apr. 3, 2012 (FR) ..................... 12 53027

(51) Int. Cl.
*B60L 11/18* (2006.01)
*H01M 10/44* (2006.01)
(Continued)

(52) U.S. Cl.
CPC ...... *B60L 11/1809* (2013.01); *B60H 1/00385* (2013.01); *B60H 1/3208* (2013.01);
(Continued)

(58) Field of Classification Search
CPC . B60L 11/185; B60L 11/1861; H01M 10/613; H01M 10/44; B60W 20/13; B60W 10/26; B60H 1/3208; Y02T 10/7005
See application file for complete search history.

(56) References Cited

U.S. PATENT DOCUMENTS 5,743,099 A * 4/1998 Kraynak .............. B60H 1/3208
                                                                  165/204
6,097,107 A   8/2000 Ikeda
(Continued)

FOREIGN PATENT DOCUMENTS

EP   1 923 240 A1   5/2008
JP   7-132725        5/1995

OTHER PUBLICATIONS

International Search Report dated Jun. 10, 2013, in PCT/FR2013/050507, filed Mar. 11, 2013.
(Continued)

*Primary Examiner* — Mussa A Shaawat
(74) *Attorney, Agent, or Firm* — Oblon, McClelland, Maier & Neustadt, L.L.P.

(57) ABSTRACT

A method of managing charging of a traction battery and corresponding devices, the traction battery including a thermal regulating system, the thermal regulating system including a compressor, the method including transmitting information between a control device for the compressor and a device for managing the charging of the traction battery, before activating the compressor or before activating a device for charging the traction battery.

13 Claims, 4 Drawing Sheets

Figure 1:
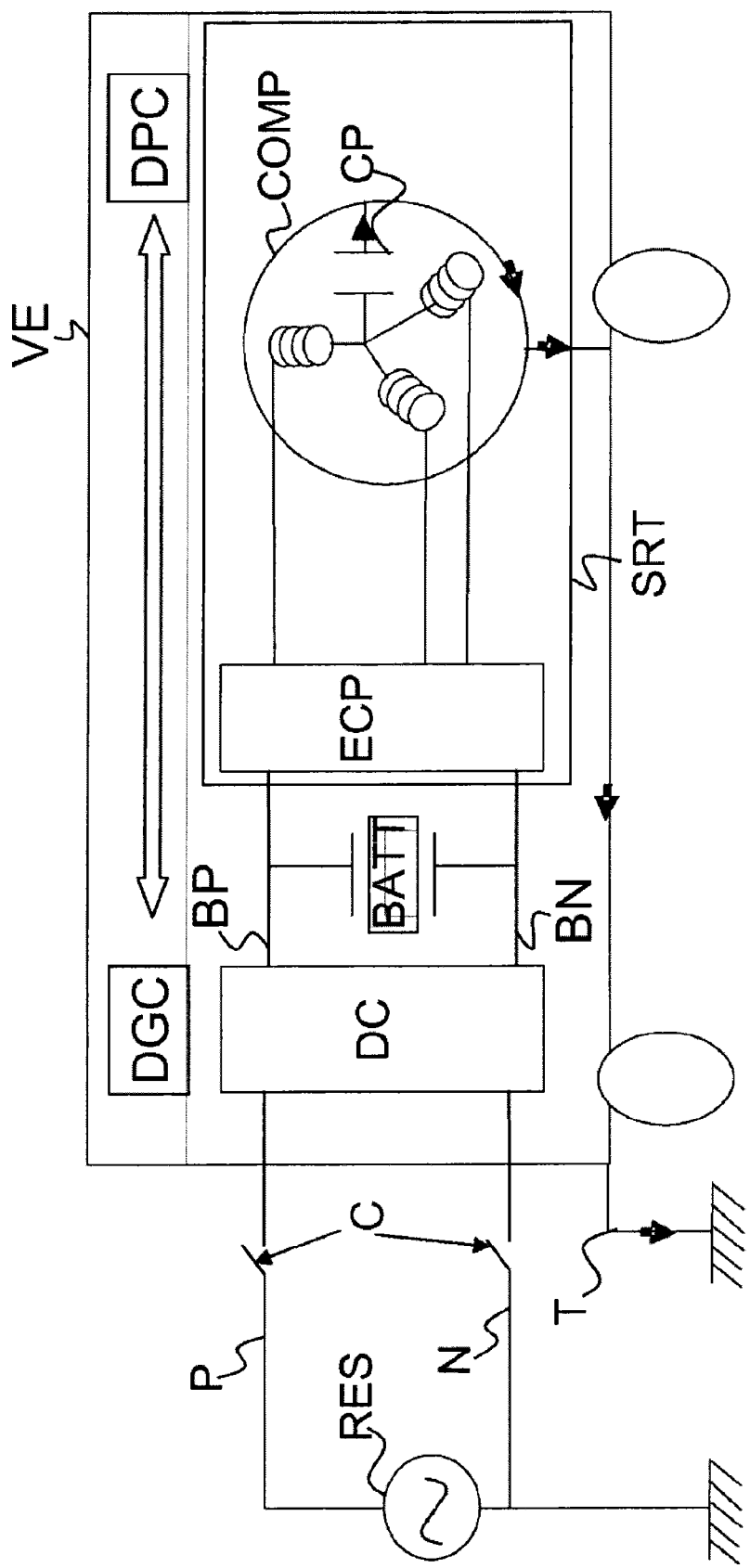

(51) Int. Cl.
  *B60H 1/00* (2006.01)
  *B60H 1/32* (2006.01)
  *B60W 10/26* (2006.01)
  *B60W 10/30* (2006.01)
  *B60L 1/00* (2006.01)
  *B60L 1/02* (2006.01)
  *B60L 3/00* (2006.01)
  *B60L 3/04* (2006.01)
  *H01M 10/625* (2014.01)
  *H01M 10/6569* (2014.01)
  *H01M 10/613* (2014.01)
  *B60W 20/13* (2016.01)

(52) U.S. Cl.
  CPC ............... *B60L 1/003* (2013.01); *B60L 1/02* (2013.01); *B60L 3/0069* (2013.01); *B60L 3/04* (2013.01); *B60L 11/1803* (2013.01); *B60L 11/185* (2013.01); *B60L 11/1816* (2013.01); *B60L 11/1861* (2013.01); *B60L 11/1874* (2013.01); *B60L 11/1875* (2013.01); *B60W 10/26* (2013.01); *B60W 10/30* (2013.01); *B60W 20/13* (2016.01); *H01M 10/44* (2013.01); *H01M 10/613* (2015.04); *H01M 10/625* (2015.04); *H01M 10/6569* (2015.04); B60H 2001/3266 (2013.01); B60H 2001/3273 (2013.01); B60L 2210/30 (2013.01); B60L 2240/34 (2013.01); B60L 2240/421 (2013.01); B60L 2240/545 (2013.01); B60L 2240/662 (2013.01); B60W 2550/12 (2013.01); B60W 2710/305 (2013.01); Y02T 10/642 (2013.01); Y02T 10/705 (2013.01); Y02T 10/7005 (2013.01); Y02T 10/7044 (2013.01); Y02T 10/7072 (2013.01); Y02T 10/7241 (2013.01); Y02T 10/7291 (2013.01); Y02T 90/121 (2013.01); Y02T 90/127 (2013.01); Y02T 90/128 (2013.01); Y02T 90/14 (2013.01); Y02T 90/16 (2013.01)

(56) References Cited

U.S. PATENT DOCUMENTS

| | | | |
|---|---|---|---|
| 2003/0187553 A1* | 10/2003 | Dillen | F02D 41/083 701/19 |
| 2005/0262853 A1* | 12/2005 | Salim | B60H 1/005 62/59 |
| 2008/0087482 A1* | 4/2008 | Ledger | B60K 6/24 180/165 |
| 2009/0193825 A1 | 8/2009 | Hara | |
| 2010/0274394 A1* | 10/2010 | Wijaya | B60H 1/00735 700/276 |
| 2011/0266075 A1* | 11/2011 | Guzelimian | B60K 16/00 180/2.2 |
| 2011/0298241 A1* | 12/2011 | Varns | B60H 1/00278 296/64 |
| 2014/0266038 A1* | 9/2014 | Gibeau | B60L 11/1875 320/109 |
| 2015/0040589 A1* | 2/2015 | Quetant | B60H 1/00921 62/81 |
| 2015/0217652 A1* | 8/2015 | Chupin | B60W 50/14 320/137 |
| 2015/0266387 A1* | 9/2015 | Garfinkel | B60L 11/187 180/65.1 |
| 2015/0329001 A1* | 11/2015 | Eifert | B60L 11/1809 320/109 |
| 2016/0052421 A1* | 2/2016 | Galamb | B60L 11/1816 165/47 |
| 2016/0059732 A1* | 3/2016 | Loftus | B60L 11/1875 701/22 |
| 2016/0229282 A1* | 8/2016 | Hettrich | B60K 11/02 |

OTHER PUBLICATIONS

French Preliminary Search Report dated Aug. 3, 2012, in Patent Application No. FR 1253027, filed Apr. 3, 2012 (with English Translation of Category of Cited Documents).

* cited by examiner

METHOD OF MANAGING THE CHARGING OF A TRACTION BATTERY AND CORRESPONDING DEVICES

The present invention relates in a general way to the fields of motor vehicles and electrical engineering, and more specifically to a method of managing the electrical charging of a vehicle having a rechargeable traction battery. This vehicle is therefore a vehicle with electric or hybrid propulsion.

A vehicle of this type is sometimes provided with a non-isolated battery charger which may cause leakage currents to flow to ground during the charging of the battery. Some of these leakage currents may be absorbed by a person touching the bodywork of the vehicle, which then has a touch current flowing through it, this current being greater as the ground connection is poorer, in other words as the ground resistance is higher.

It is therefore desirable to reduce as far as possible these leakage currents, some of which are generated by the users of the vehicle's electrical system. Notably, if this system is provided with a heat regulating system, the compressor of the latter system may generate ground leakage currents during its operation.

The term "heat regulating system" here denotes any system for modifying the temperature of an element of the vehicle, whether it is a heat pump system for heating the passenger compartment of the vehicle, an air conditioning system, or a thermodynamic control loop for regulating the battery temperature.

The leakage currents generated by the compressor of the vehicle's heat regulating system become greater when vehicle charging is initiated, because the voltages of the supply network recharging the vehicle's traction battery increase the strength of the leakage currents that may pass into the common mode capacitances of the various electrical users downstream of the charger. Moreover, the leakage currents generated by the compressor of the heat regulating system have a frequency determined by the control electronics of the compressor and a strength such that they may mislead the differential protection mechanisms normally used during the charging of the vehicle.

Usually, the electrical risks due to the compressor of a vehicle are overcome by improving the quality of the ground connection of the compressor. This is the case, for example, in Japanese patent application JP07132725 which proposes to improve the ground connection at the compressor of an air-conditioned vehicle. However, this proposal does not greatly enhance safety, since it does not limit the strength of the leakage currents due to the compressor.

There is also a known method of limiting the leakage currents caused by the compressor of a heat regulating system, by adding electronic components to the control electronics of the compressor, as proposed, for example, in Japanese patent application JP01243843. This method of limiting the leakage currents is costly, however, and may prove to be extremely complicated in some cases.

One of the objects of the invention is to overcome at least some of the drawbacks of the prior art by providing a method of managing the charging of a traction battery of a vehicle and the associated devices for the electrical recharging of the vehicle, by minimizing the electrical risks due, notably, to the leakage currents of the heat regulating system of the vehicle.

For this purpose, the invention proposes a method of managing the charging of a traction battery of a vehicle including a heat regulating system, said heat regulating system including a compressor, said method being characterized in that it includes a step of transmitting information between a control device of the compressor and a device for managing the charging of said traction battery, before a step of activating the compressor or before a step of activating a device for charging said traction battery.

As a result of the invention, the charging management device or the compressor control device are capable of taking into account a subsequent step of charging the vehicle or a subsequent step of activating the compressor, in order to limit the leakage currents by adopting an appropriate strategy. This strategy consists, for example, in:

the electrical isolation of the compressor during the charging of the vehicle, the compressor being disabled at that time, or the delaying of the charging of the vehicle until the compressor ceases to be filled with liquid, so that the leakage currents due to the compressor can be reduced.

According to an advantageous characteristic of the method of managing charging according to the invention, said step of information transmission corresponds to a step in which said compressor control device sends information representative of a state of the compressor to said device for managing the charging of the traction battery.

Knowledge of the state of the compressor enables the charging management device to determine when to start the electrical recharging of the vehicle while minimizing the electrical risks, and thus enables the device to choose the optimal strategy for limiting leakage currents.

According to another advantageous characteristic, the method of managing charging according to the invention further includes a step of creating electrical isolation between said compressor and an external supply network intended to charge said traction battery, when said information is representative of an imminent activation of said compressor.

According to another advantageous characteristic, the method of managing charging according to the invention further includes a step of interrupting or postponing the charging of said traction battery for at least a first predetermined duration, when said information is representative of an imminent activation of said compressor.

The fact that the activation of the compressor is given priority over the electrical charging of the vehicle in this way is advantageous, because the starting of the compressor is much faster than the full charging of a traction battery. Furthermore, the traction battery generally has to be heated or cooled by a heat regulating system in order to be recharged, so that the charging of the vehicle commonly requires the starting of a compressor.

According to another advantageous characteristic, said first predetermined duration is a function of the external temperature and/or the current speed of the compressor.

The interruption or postponement of the charging of the vehicle is thus limited as closely as possible to the duration required for the discharge of most of the liquid contained in the compressor during its starting.

According to another advantageous characteristic, said first predetermined duration is incremented by a duration required for the motor of said compressor to reach a predetermined minimum speed, which is a function of the external temperature.

This incrementation makes it possible to use a compressor speed at least equal to a speed below which the discharge of the liquid is not considered to be feasible, according to the external temperature.

According to an advantageous characteristic of the invention, if said compressor requires several activation steps to meet a requirement of the heat regulating system, the charging of said traction battery is uninterrupted after a predetermined number of steps of activation of said compressor.

This additional characteristic makes it possible, if the step of activating the compressor takes priority over the step of activating the vehicle charging device, to reduce the vehicle charging time and avoid intermittent charging which would damage the components of the charging device, for example if the compressor had an operating fault or if the regulating system forced the compressor to execute cycles of activation and de-activation.

According to another advantageous characteristic, said control device of said compressor sets a minimum speed at the motor of said compressor, this minimum speed being a function of the external temperature.

This additional characteristic also makes it possible to reduce the vehicle charging time, even if the step of activating the compressor takes priority over the step of activating the vehicle charging device.

According to another advantageous characteristic, said step of information transmission is followed by a step of delaying the step of activating the compressor for a second predetermined duration which is shorter than said first predetermined duration, and said compressor control device sends information representative of an advanced state of activation of the compressor at the end of said first predetermined duration.

This additional characteristic enables the logic of the method of managing charging according to the invention to be implemented in the compressor control device, thus facilitating the handling of the constraints due to the compressor control, which vary, notably, as a function of the external temperature, the preceding state of the compressor, and the like.

According to a variant embodiment of the invention, said step of information transmission is preceded by a step of interrogation about the state of the compressor by said charging management device, and said first predetermined duration is supervised by said charging management device.

According to this variant, the logic of the method of managing charging according to the invention is implemented in the charging management device, thus enabling the charging of the vehicle to be managed more easily. This is because, in this variant, the charging management device communicates with the compressor control device according to a request/response model which makes it possible to avoid managing a supplementary logical process.

According to a variant embodiment of the invention, said step of isolation is followed by a step of disabling the compressor until the end of a step of charging the traction battery.

In this alternative, the step of activating the charging device takes priority over the step of activating the compressor, the latter being isolated electrically from the charging device in order to reduce the leakage currents due to the compressor.

The invention also relates to a charging management device, characterized in that it includes means for applying the method of managing charging according to the invention.

The invention further relates to a device for controlling a compressor, characterized in that it includes means for applying the method of managing charging according to the invention.

Finally, the invention relates to a computer program including instructions for applying the method of managing charging according to the invention, when it is run on one or more processors.

The charging management device according to the invention, the device for controlling a compressor according to the invention, and the computer program have advantages similar to those of the method of managing charging according to the invention.

Figure 2:
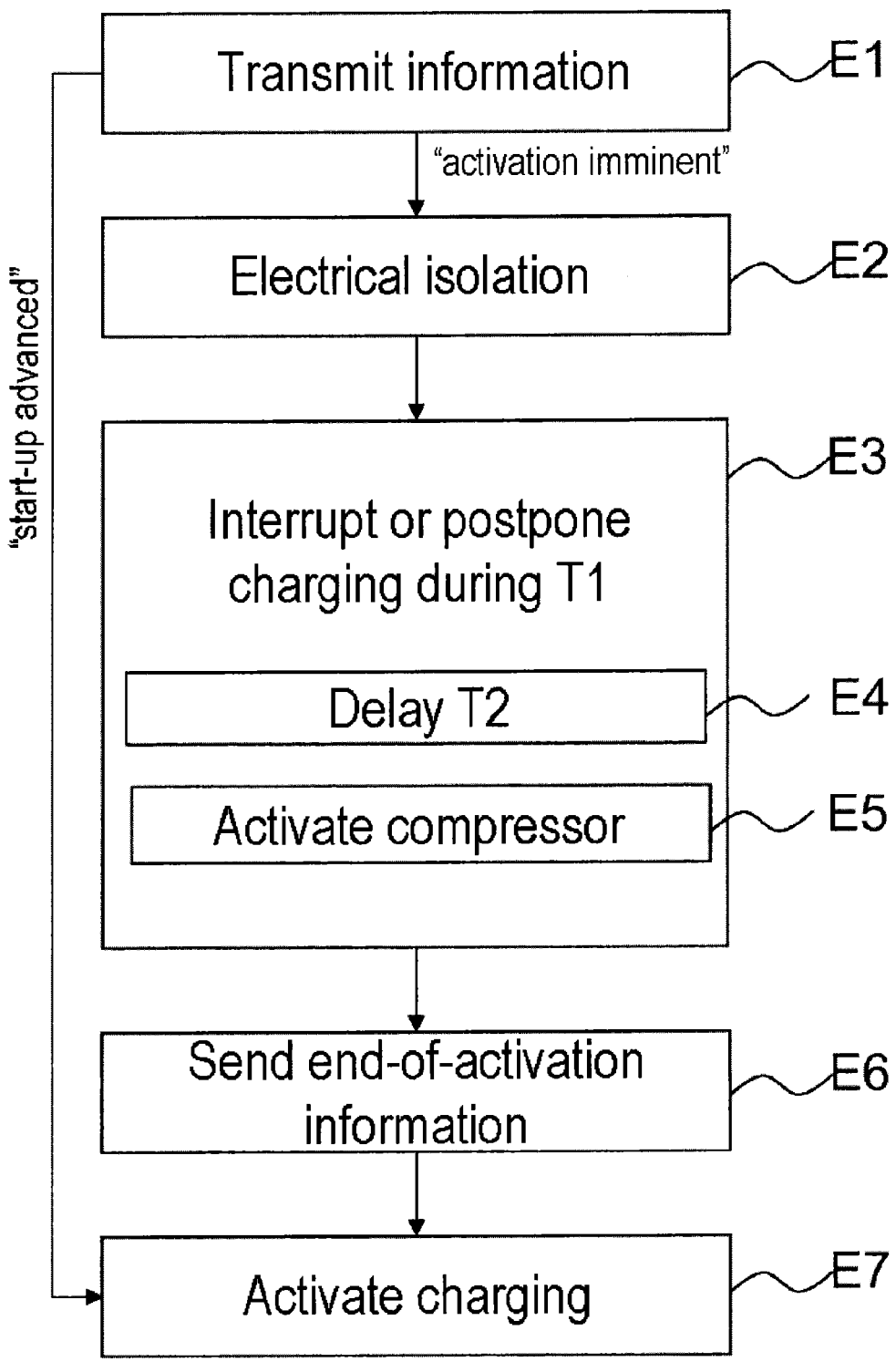
Figure 3:
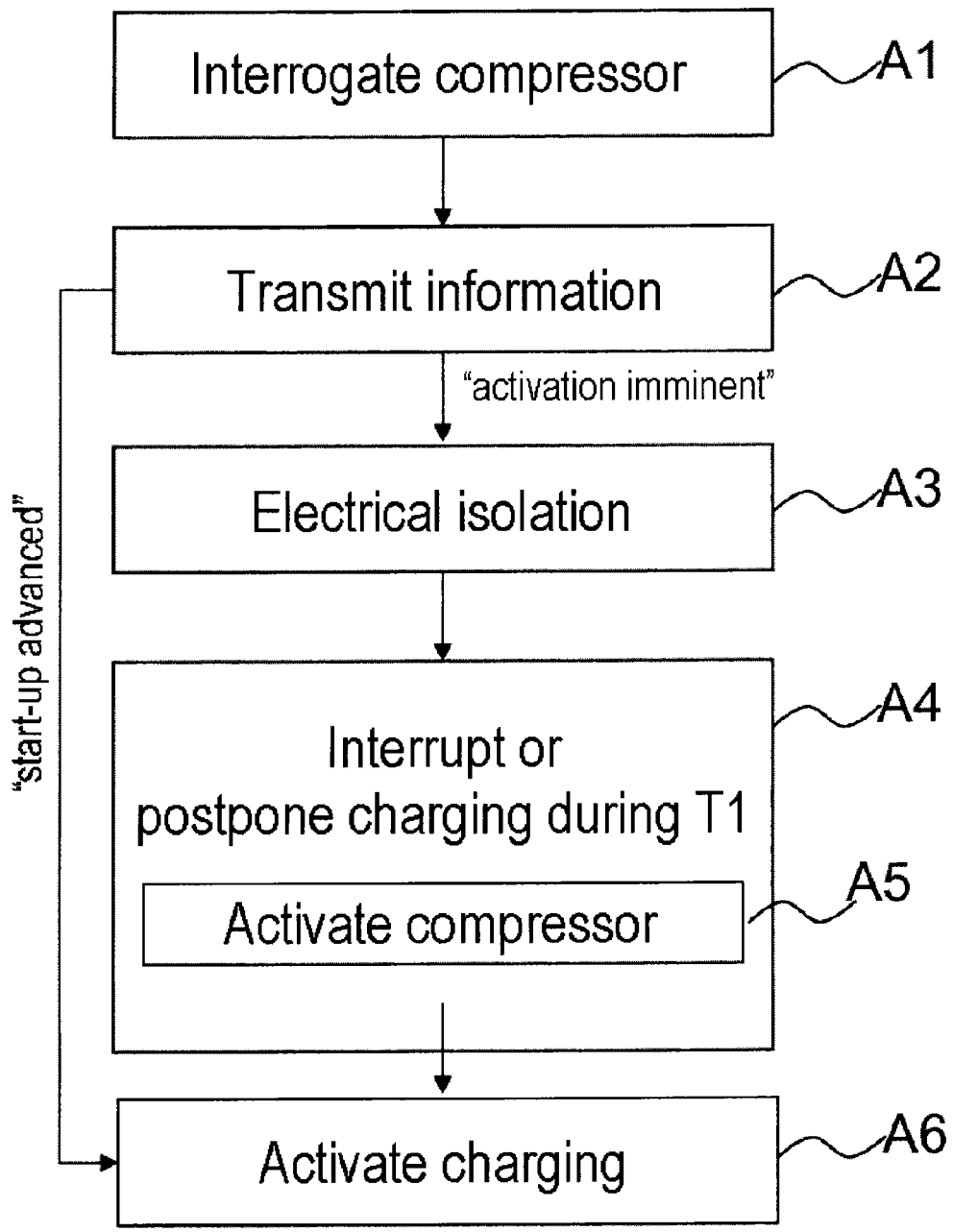
Figure 4:
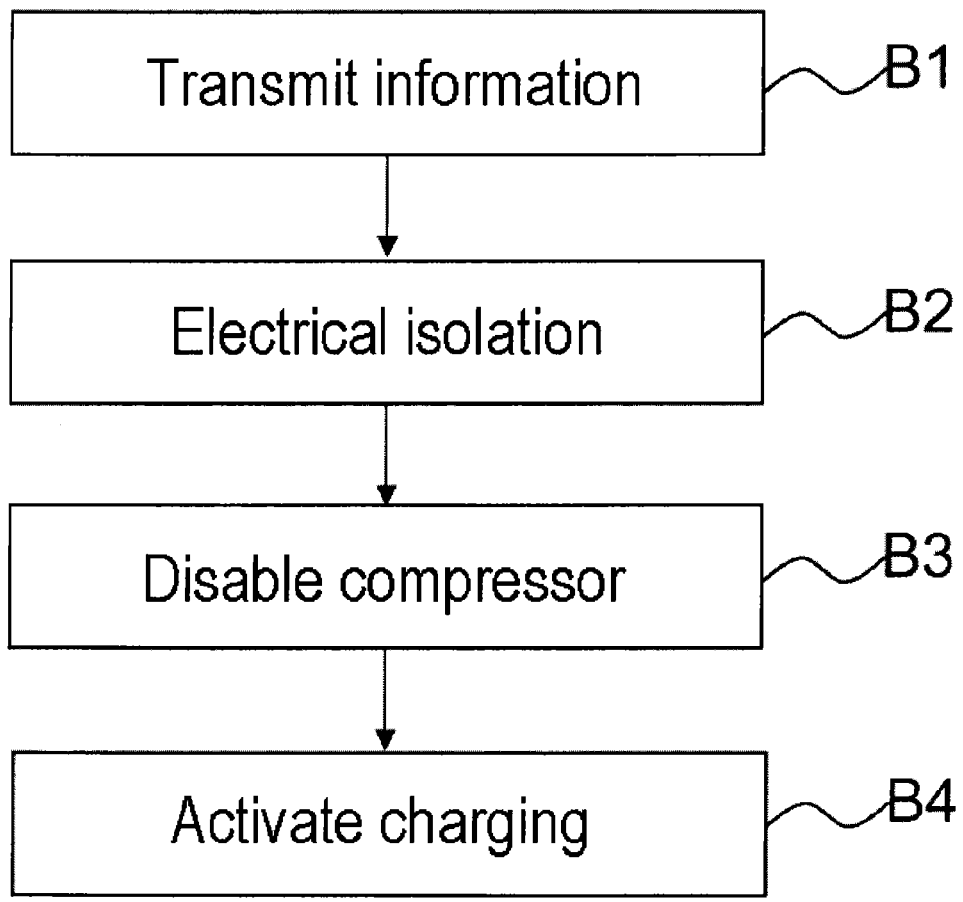

Other characteristics and advantages will be evident from the preferred embodiments described with reference to the drawings, in which:

FIG. 1 shows a vehicle including a charging management device and a compressor control device according to the invention, FIG. 2 shows steps of the method of managing charging according to the invention, in a first embodiment of the invention, FIG. 3 shows steps of the method of managing charging according to the invention, in a second embodiment of the invention, and FIG. 4 shows steps of the method of managing charging according to the invention, in a third embodiment of the invention.

According to a preferred embodiment of the invention shown in FIG. 1, an electric or hybrid vehicle VE has a traction battery BATT which is rechargeable by an external electrical power supply network RES, via a charging device DC. The charging device DC has means of connection to a phase line P and to a neutral line N of the network RES, these connecting means being provided with contactors C enabling the network RES and the charging device DC to be isolated electrically.

In this example of the use of the invention, the network RES is a single-phase network, but the charging device DC also includes means for recharging the battery BATT from a three-phase supply network or from a continuous supply network.

The charging device DC is connected to the high voltage system of the vehicle VE. More precisely, the output terminals of the charging device DC are connected, on the one hand, to a bus BP which is itself connected to the positive terminal of the battery BATT, and, on the other hand, to a bus BN which is itself connected to the negative terminal of the battery BATT.

The vehicle VE also has a heat regulating system SRT which itself includes a compressor COMP. The motor of the compressor COMP has stator windings supplied by the battery BATT via an electronic control system ECP of the compressor COMP. The electronic control system ECP of the compressor COMP is connected at its input to the buses BP and BN of the battery BATT, and at its output to the stator windings of the compressor COMP.

If the compressor COMP is active, the electronic control system ECP of the compressor COMP generates control pulses on the stator windings of the compressor COMP, which are then supplied by a three-phase current having a certain frequency and a certain strength. The stator windings of the compressor COMP have a parasitic capacitance CP due to the coupling to the chassis of the vehicle VE. If the compressor COMP is active, therefore, a leakage current dependent on the quench frequency of the electronic system ECP and on the value of the parasitic capacitance CP flows through the parasitic capacitance CP. This leakage current normally flows to ground T along the path shown by the black arrows in FIG. 1.

The parasitic capacitance CP is typically a few nanofarads, and may increase by several tens of nanofarads if the fluid of the heat regulating system SRT is concentrated in the liquid state in the compressor COMP, which may be the case when the latter has been idle for a long period. This is because the stator windings of the compressor COMP are immersed in a mixture of oil and coolant, and therefore the parasitic capacitance CP varies largely according to the operating mode of the compressor, the external temperature, and, for example, the amount of water in the fluid.

If the compressor COMP is activated after being idle for a long time, for example in order to pre-condition the passenger compartment of the vehicle VE, or to defrost the front face of the vehicle, or to pre-condition the battery BATT for the purpose of recharging it, and if the charging of the battery BATT is activated, the leakage current due to the compressor COMP may loop back via the supply network RES if the ground connection T is defective. In this case, this leakage current may mislead the protective devices for the charging of the vehicle VE, preventing the cut-off of the supply to the charging device DC even if a touch current is present. This is due, notably, to the strength and frequency of this leakage current, which are not detected by the usual differential protection mechanisms.

The method of managing charging according to the invention makes it possible to reduce the leakage currents due to the compressor COMP during the charging of the vehicle VE, by using one or more charging strategies implemented at least partially in a charging management device DGC according to the invention and/or in a device DPC according to the invention for controlling the compressor COMP. The charging management device DGC and the control device DPC for the compressor COMP communicate via the CAN (standing for the English expression "Controller Area Network") communication bus of the vehicle VE. These two devices are also interfaced with other actuators or computers of the vehicle VE via this CAN bus.

The compressor control device DPC is distributed among a plurality of computers, including an air conditioning management computer, a computer for managing the compressor speed request as a function of the requirements of the air conditioning management computer, and the electromechanical actuator part, as well as the integrated electronic circuit card of the compressor COMP itself. The compressor control device DPC therefore includes both hardware and software.

A first embodiment of the method of managing charging according to the invention is shown in FIG. 2, in the form of an algorithm having steps E1 to E7.

In this first embodiment, the method of managing charging according to the invention is mainly implemented in the control device DPC of the compressor COMP. It limits the leakage currents due to the compressor COMP during a process of charging the battery BATT, by discharging most of the liquid contained in the compressor COMP before the charging process, or by interrupting the charging before starting the compressor COMP. The value of the parasitic capacitance CP is thus greatly reduced when the battery BATT is being charged.

It is therefore assumed, in this first embodiment, that a request for activation of the charging device DC, sent by the charging management device DGC, or a request for activation of the compressor COMP, sent by a computer of the heat regulating system SRT, is reviewed by the control device DPC of the compressor COMP, thus launching the method of managing charging according to the invention.

The first step E1 is the transmission, by the control device DPC of the compressor COMP, of information representative of a state of the compressor COMP to the charging management device DGC. If this information is representative of an advanced state of starting of the compressor COMP, the charging management device DGC activates the charging of the battery BATT according to step E7, the parasitic capacitance CP of the compressor COMP already being relatively small. Conversely, if this information is representative of the imminent activation of the compressor COMP, or its activation for a duration below a specified duration, the next step is step E2.

Step E2 is the electrical isolation between the compressor COMP and the network RES. This electrical isolation is provided by the opening of the contactors C between the charging device DC and the network RES. In a variant, it is provided by the opening of contactors between the battery BATT and the charging device DC, or alternatively by the opening of the switches of a rectifier or inverter stage of the charging device DC.

The next step E3 is the interruption or postponement of the charging of the battery BATT by the charging management device DGC, for at least a first predetermined duration T1. This first predetermined duration T1 is supervised by the control device DPC of the compressor COMP, which executes two substeps during this step E3:

In a first substep E4, the control device DPC of the compressor COMP delays the activation of the compressor COMP for a second predetermined duration T2 of about 500 milliseconds, enabling the charging management device DGC to receive the information transmitted in step E1 and to interrupt a charging process if the battery BATT is already being charged.

In a second substep E5, the control device DPC of the compressor COMP activates the compressor COMP.

At the end of the first predetermined duration T1, the control device DPC of the compressor COMP sends information representative of an advanced state of activation of the compressor COMP to the charging management device DGC according to a step E6 of the method of managing charging according to the invention.

On receiving this information representative of an advanced state of activation of the compressor COMP, the charging management device DGC activates or reactivates the charging of the battery BATT according to step E7. For this purpose, the contactors C are reclosed.

The first predetermined duration T1 is between about 2 and 15 seconds approximately. It is calculated in such a way that most of any liquid present in the compressor COMP is discharged from the compressor COMP, thus significantly reducing the parasitic capacitance CP of the compressor COMP. This calculation is performed, for example, in a dynamic way by the control device DPC of the compressor COMP as a function of the temperature outside the vehicle VE and/or the current speed of the compressor COMP, that is to say its speed range. In a variant, the control device DPC of the compressor COMP determines the first predetermined duration T1 as a function of the external temperature only, but does not increment the counter allowing the duration T1 to expire until the compressor COMP has reached a predetermined minimum speed which is a function of the external temperature. Thus the first predetermined duration T1 is incremented by a duration required for a speed of the compressor COMP to be reached, without the use of tables or calculations, while interrupting or deferring the charging of the battery BATT for the shortest possible time.

The control device DPC of the compressor COMP sets a minimum speed at the motor of the compressor COMP if necessary, to limit the duration of the interruption or postponement of the charging of the battery BATT. This constraint is, for example, imposed on the compressor COMP when permitted by the state of the compressor COMP and the external temperature.

Since the control device DPC of the compressor COMP interrupts the charging of the battery BATT when the compressor is started, it may happen, for example if the compressor overheats or if there is a requirement for cycles of activation/de-activation of the compressor controlled by the heat regulating system SRT, that a number of interruptions of charging are required during the heat regulation request. In this case, the control device DPC of the compressor COMP stops the compressor COMP at the end of a predetermined number of interruptions of charging, for example two, due to the compressor COMP, to allow the charging of the battery BATT to take place without interruption.

A second embodiment of the method of managing charging according to the invention is shown in FIG. 3, in the form of an algorithm having steps A1 to A6.

In this second embodiment, the method of managing charging according to the invention is mainly implemented in the charging management device DGC, according to the same strategy of partial drainage of the compressor COMP before or during a process of charging of the battery BATT as in the first embodiment of the invention.

In this second embodiment, the charging management device DGC automatically interrogates the control device DPC of the compressor COMP before activating the charging of the battery BATT. It is therefore assumed, before the first step A1 of the method of managing charging according to the invention, that the charging management device DGC is preparing to activate a process of charging the traction battery BATT. In a variant, the charging management device DGC does not automatically interrogate the control device DPC of the compressor, and itself supervises its interruption for a first predetermined duration T1. In this variant, the method of managing charging according to the invention starts at step A2, described below.

According to the main variant of this second embodiment of the invention, step A1 is the interrogation, by the charging management device DGC, of the control device DPC of the compressor about the state of the compressor COMP.

The next step A2 is the transmission, by the control device DPC of the compressor COMP, of information on the state of the compressor COMP to the charging management device DGC. If this information is representative of an advanced state of starting of the compressor COMP, the charging management device DGC activates the charging of the battery BATT according to step A6, the parasitic capacitance CP of the compressor COMP already being relatively small. Conversely, if this information is representative of the imminent activation of the compressor COMP, or its activation for a duration below a specified duration, the next step is step A3.

Step A3 is the electrical isolation between the compressor COMP and the network RES. This electrical isolation is provided in the same way as in step E2, by opening contactors, or switches of the charging device DC.

The next step A4 is the postponement of the charging of the battery BATT by the charging management device DGC, for at least a first predetermined duration T1. This first predetermined duration T1 is supervised by the charging management device DGC, which executes, during this step A4, a substep A5 of activation of the compressor COMP, by sending an activation message to the control device DPC of the compressor COMP. The first predetermined duration T1 must allow most of any liquid present in the compressor COMP to be discharged from the compressor COMP, thus significantly reducing the parasitic capacitance CP of the compressor COMP. It is, for example, determined by the charging management device DGC, using tables providing a value of the first predetermined duration T1 as a function of the external temperature.

The next step A6 is the activation of the charging of the battery BATT, at the end of the first predetermined duration T1.

A third embodiment of the method of managing charging according to the invention is shown in FIG. 4, in the form of an algorithm having steps B1 to B4.

In this third embodiment, the method of managing charging according to the invention is mainly implemented in the charging management device DGC, according to a strategy of automatically stopping and electrically isolating the compressor COMP during a process of charging the battery BATT of the vehicle VE. This provides freedom from leakage currents due to the compressor COMP during the charging of the battery BATT.

It is therefore assumed, before the first step B1 of the method of managing charging according to the invention, that the charging management device DGC is preparing to activate a process of charging the traction battery BATT.

Step B1 is the transmission to the control device DPC of the compressor COMP, by the charging management device DGC, of information representative of the imminent charging of the battery BATT.

Step B2 is the electrical isolation of the compressor COMP relative to the charging device DC. This isolation is provided, for example, by opening the switches of an inverter stage of the electronic control circuit ECP of the compressor COMP.

Step B3 is the disabling of the control of the compressor COMP.

Finally, step B4 is the activation of the charging of the battery BATT, notably by the closing of the contactors C. Throughout this step B4, the compressor COMP is stopped, and therefore cannot provide its thermal services to the vehicle VE. This third embodiment of the invention, which is more radical than the first two and has the aim of providing freedom from leakage currents due to the compressor COMP, is therefore only feasible if the charging of the battery BATT can be carried out without pre-conditioning of the battery BATT.

At the end of step B4, the charging management device DGC alerts the control device DPC of the compressor COMP to the fact that charging has ended, enabling it to reactivate the compressor COMP if necessary.

It should be noted that these embodiments of the invention are not exhaustive, and that the communication between the charging management device DGC and the control device DPC of the compressor COMP may be more or less limited or, conversely, highly elaborate. Thus the information transmitted in the first step of the method of managing charging according to the invention is representative of the following conditions, depending on the chosen implementation of the method of managing charging according to the invention:

an imminent activation of the compressor COMP,
or an activation of the compressor COMP for a duration shorter than a specified duration, or an advanced state of activation of the compressor COMP, if the charging management device DGC enables the charging of the battery BATT only after receiving this information, or an imminent activation of a process of charging the battery BATT, or the end of charging of the battery BATT, for example if the control device DPC of the compressor COMP enables the activation of the compressor COMP only after receiving this information.

It is also feasible to implement the invention in a different way; for example, it is possible to integrate the charging management device DGC and the control device DPC of the compressor COMP into the same central computer of the vehicle.

The invention claimed is:

1. A method of managing charging of a traction battery of a vehicle having a heat regulating system including a compressor, the method comprising:

monitoring, via a control device of the compressor, a status of the compressor;

transmitting, via the control device, information of the status of the compressor, before activating the compressor or before activating charging of the traction battery, between the control device and a charging management device for managing charging of the traction battery; or transmitting, via the charging management device, information of a charging status, before activating the compressor or before activating charging of the traction battery, between the charging management device and the control device; and controlling, based on the transmitted information, at least one of the compressor and the charging of the traction battery.

2. The method of managing charging as claimed in claim 1, further comprising:

providing electrical isolation between the compressor and an external supply network configured to charge the traction battery when the information is representative of an imminent activation of the compressor.

3. The method of managing charging as claim in claim 1, further comprising:

interrupting or postponing the charging of the traction battery for at least a first predetermined duration when information is representative of an imminent activation of the compressor.

4. The method of managing charging as claimed in claim 3, wherein the first predetermined duration is a function of at least one of an external temperature and current speed of the compressor.

5. The method of managing charging as claimed in claim 3, wherein the first predetermined duration is incremented by a duration required by a motor of the compressor to reach a predetermined minimum speed which is a function of an external temperature.

6. The method of managing charging as claimed in claim 3, wherein, when the compressor requires plural activations to meet a requirement of the heat regulating system, the charging of the traction battery is uninterrupted after a predetermined number of activations of the compressor.

7. The method of managing charging as claimed in claim 3, wherein the control device of the compressor sets a minimum speed at a motor of the compressor, the minimum speed being a function of an external temperature.

8. The method of managing charging as claimed in claim 3, further comprising:

delaying, after transmitting the information, the activation of the compressor for a second predetermined duration which is shorter than the first predetermined duration, and transmitting information representative of an advanced state of activation of the compressor at an end of the first predetermined duration.

9. The method of managing charging as claimed in claim 3, wherein the transmitting information is preceded by an interrogation about a state of the compressor by the charging management device, and the first predetermined duration is supervised by the charging management device.

10. The method of managing charging as claimed in claim 2, further comprising:

disabling the compressor after the electrical isolation and until an end of charging the traction battery.

11. A device for managing charging of a traction battery of a vehicle having a heat regulating system including a compressor, the device comprising:

a charging management device for managing charging of the traction battery and configured to receive, from a control device of the compressor and before activating charging the traction battery, a status of the compressor monitored by the control device, and control, based on the received information, the charging of the traction battery, wherein the control device controls the compressor based on the status of the compressor.

12. A device for controlling a compressor of a vehicle, comprising:

a control device configured to monitor a status of the compressor, transmit, before activating the compressor and before activating charging the traction battery, information of the status of the compressor to a charging management device that manages charging of the traction battery of the vehicle based on the status, and control the compressor based on the status of the compressor, wherein the charging management device is configured to control the charging of the traction battery based on the status of the compressor.

13. A non-transitory computer readable medium having computer readable instructions thereon which when executed by a computer cause the computer to perform a method as claimed in claim 1.

* * * * *